No. 829,963. PATENTED SEPT. 4, 1906.
J. W. HAUGHAWOUT.
TARGET TRAP.
APPLICATION FILED NOV. 14, 1904.
2 SHEETS—SHEET 1.
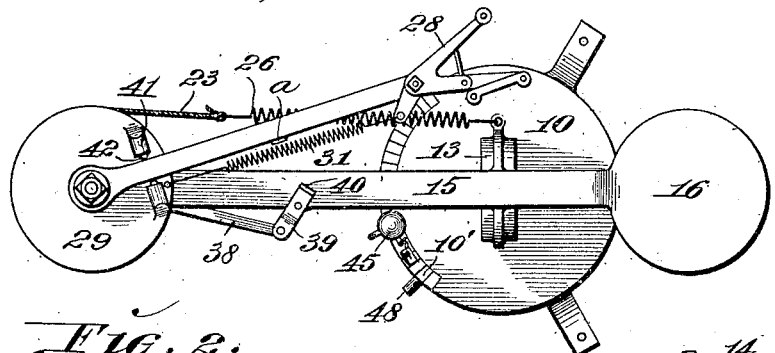
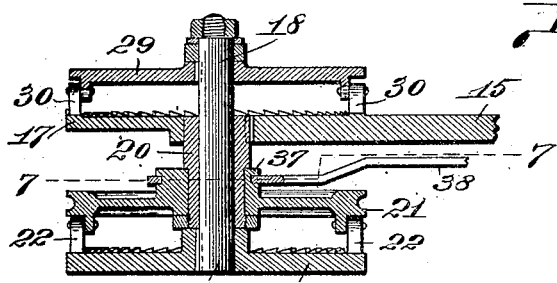
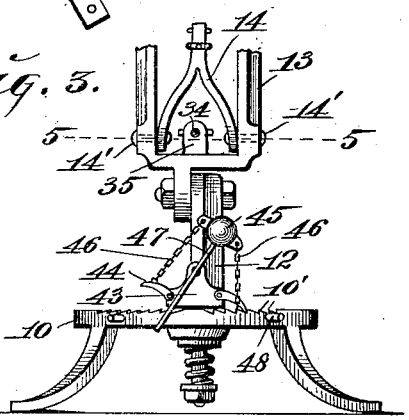
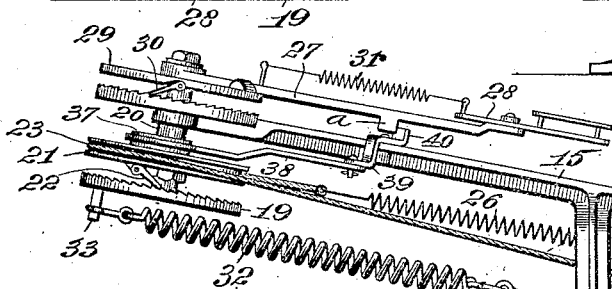
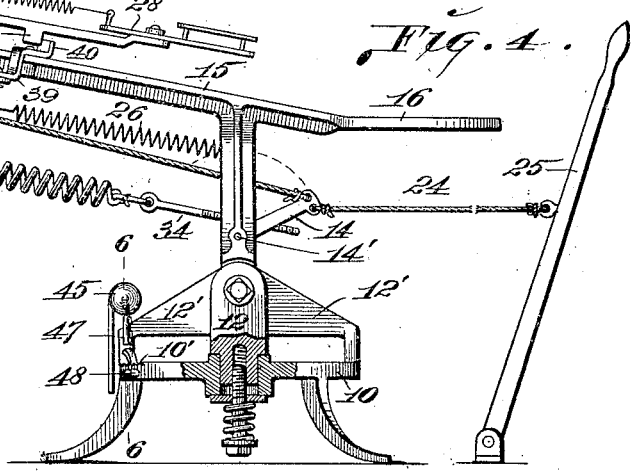
Attest:
M. P. Smith
Blanche Hogan
Inventor:—
John W. Haughawout
By Wright Bros.
attys.

No. 829,963. PATENTED SEPT. 4, 1906.
J. W. HAUGHAWOUT.
TARGET TRAP.
APPLICATION FILED NOV. 14, 1904.

2 SHEETS—SHEET 2.

Attest:
M. P. Smith
Blanche Hogan

Inventor.
John W. Haughawout
By Wright Bro
attys.

UNITED STATES PATENT OFFICE.

JOHN W. HAUGHAWOUT, OF FORT DODGE, IOWA, ASSIGNOR, BY MESNE ASSIGNMENTS, TO THE CHAMBERLIN CARTRIDGE & TARGET COMPANY, OF CLEVELAND, OHIO, A CORPORATION.

TARGET-TRAP.

No. 829,963.  Specification of Letters Patent.  Patented Sept. 4, 1906.

Application filed November 14, 1904. Serial No. 232,755.

*To all whom it may concern:*

Be it known that I, JOHN W. HAUGHAWOUT, a citizen of the United States, residing at Fort Dodge, in the county of Webster and State of Iowa, have invented a new and useful Target-Trap, of which the following is a specification.

My invention relates to target-traps, and, briefly stated, consists, first, in a rotatably-mounted pulley-wheel having loose connection with a trap throw-arm and a main throw-arm-operating spring in which power is stored by the actuation of said pulley-wheel; second, in an eccentric hub carried by the pulley-wheel and a throw-arm-receiving latch connected to said eccentric hub to hold the throw-arm when power is stored in the main operating-spring; third, in means connected with the pulley-wheel for retracting it and its eccentric hub after the trap has been set; fourth, in ratchet-and-pawl connection between the trap throw-arm and said pulley-wheel to provide for the actuation of the throw-arm by said wheel; fifth, in ratchet-and-pawl connection between the throw-arm and the trap-frame to prevent retrograde rotation of the throw-arm; sixth, in cushions by which the throw-arm is received to prevent jar thereof when said arm is thrown; seventh, in a rocker-lever to which the main throw-arm-operating spring is connected; eighth, in an attachment for automatically changing the inclination of the trap-frame by imparting oscillation to the trap-frame when the trap is operated.

Figure 5:
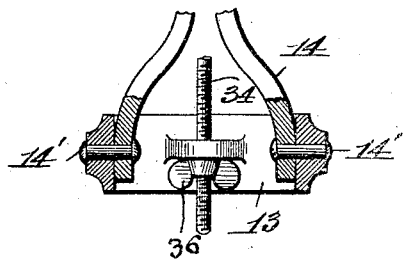
Figure 6:
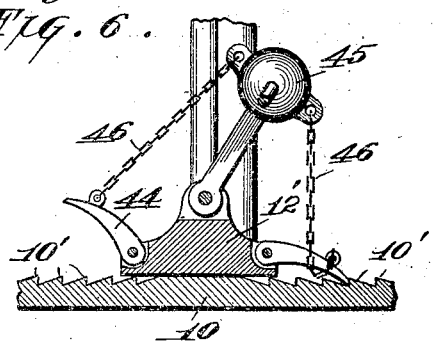
Figure 7:
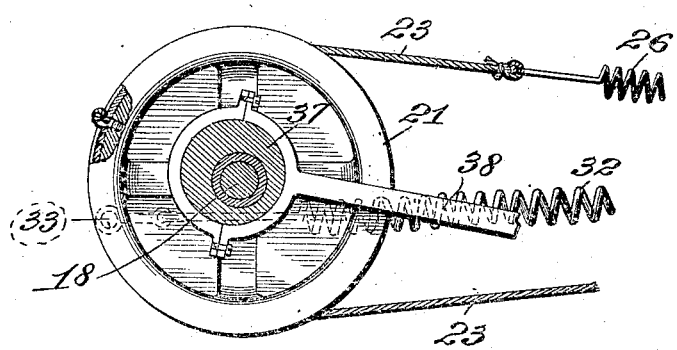

Figure 1 is a top or plan view of the frame of my trap, the throw-arm, and the parts immediately associated with said throw-arm. Fig. 2 is an enlarged vertical longitudinal section taken through the rear end of the trap-frame and the throw-arm-actuating members supported thereby. Fig. 3 is a rear elevation of the base and lower portion of the frame of the trap. Fig. 4 is a side elevation of the trap. Fig. 5 is an enlarged horizontal section taken on line 5 5, Fig. 3. Fig. 6 is an enlarged vertical section taken on line 6 6, Fig. 4. Fig. 7 is a horizontal cross-section taken on line 7 7, Fig. 2, with parts beneath said line shown in plan.

10 designates the base of the trap, which is adapted to be mounted upon and secured to a suitable foundation or support. This base is surmounted by a rotatable post 12, that is loosely mounted in and pivoted to the base at its center and has diverging arms 12' adapted to ride upon the top of the base to steady the post. At the upper side of the base adjacent to its periphery are ratchet-teeth 10', as seen in Fig. 3.

13 is an upright member pivoted to the post 12 and which carries the trap-frame 15, of which it is a part. At the forward end of the frame 15 is a rest for the arm of the person engaged in loading targets into the carrier of the trap. At the rear end of the frame 15 is a ratchet member 17, the teeth of which are at the upper side of said member, as seen in Figs. 2 and 4.

20 is a sleeve rigidly mounted in the rear end of the frame 15 within the radius of the ratchet-teeth of the member 17. This sleeve extends downwardly from the frame 15, and its lower portion is preferably reduced in diameter, as seen in Fig. 2.

21 is a pulley-wheel loosely fitted to the reduced portion of the sleeve 20 and preferably provided with a groove at its periphery. At the upper side of the pulley-wheel, and preferably integral therewith, is an eccentric hub 37, the utility of which will be hereinafter set forth.

22 represents pawls pivoted to the pulley-wheel at its lower side.

18 designates a shaft extending vertically through the sleeve 20. The upper end of this shaft terminates above the ratchet member 17 of the trap-frame and the lower end terminates beneath the lower end of the sleeve 20.

19 is a ratchet-wheel fixed to the shaft 18 at its lower end and the teeth of which are disposed upon its upper side to receive the engagement of the pawls 22, carried by the surmounting pulley-wheel 21.

23 designates a rope or pull connection fixed at one end to the pulley-wheel 21 and through the medium of which rotation is imparted to said pulley-wheel.

14 designates a rocker swingingly mounted in the frame member 13 on pivot-pins 14' (see Figs. 3, 4, and 5) and to which the pull connection 23 is united, as seen in Fig. 4.

24 is a rope or pull connection attached at one end to the rocker 14 and leading to a lever 25, by which pull may be exerted upon said connection 24 to oscillate the rocker 14 and pull the connection 23 to rotate the pulley-wheel 21.

26 is a pulley-wheel-retracting spring connected at one end to the pulley-wheel 21 and having its other end connected to the trap-frame. This spring serves to return the pulley-wheel to its normal position after it has been rotated to store power in the main operating-spring to carry the throw-arm into target-receiving position.

27 designates the throw-arm of the trap, which is loosely fitted to the upper end of the shaft 18 and has attached to its outer end a target-carrier 28, that may be of any ordinary construction.

29 designates a disk fixed to the shaft 18 and located beneath the inner end of the throw-arm. This disk surmounts the ratchet member 17 and has pivoted thereto pawls 30, that are adapted to engage the teeth of said member.

31 is a spring connected at one end to the disk 29 and at the other end to the target-carrier 28, whereby said carrier is yieldingly held, as is usual.

32 designates a main operating-spring that is connected at one end to the ratchet-disk 19 by attachment to a crank-pin 33 carried by said disk. The other end of the main operating-spring has connected to it a tension-rod 34, that passes through an ear 35, projecting from the frame member 13, and on the tension-rod is a nut 36, through the medium of which the tension in the main operating-spring may be altered.

38 designates a shift-rod loosely fitted to the eccentric hub 37 of the pulley-wheel 21 and extending forward therefrom, as seen in Figs. 1, 2, and 4.

39 is a latch pivoted to the trap-frame 15 at its upper side and to which the shift-rod 38 is pivoted. The latch 39 is provided with an upturned lip 40. This lip is designed to receive the engagement of a finger $a$, carried by the throw-arm 27, when the latch is swung to bring its lip 40 into the path of travel of said finger as the finger passes into a position over the frame 15, this movement of the latch being accomplished by the operation of the shift-rod 38 through the medium of the eccentric hub 37, to which it is fitted.

41 designates sockets on the upper side of the disk 29 and located at opposite sides of the throw-arm 27, which is loosely fitted to the shaft 18, as stated, and is therefore free to play to a limited extent between said sockets. In the sockets 41 are cushions 42, that receive the impact of the throw-arm and relieve jar or concussion when the throw-arm is operated in the act of discharging a target therefrom.

To provide an automatic change in the direction of inclination of the trap-frame by causing it to oscillate with respect to the base 10, on which it is supported, when the target is discharged, thereby causing the targets to be thrown in alternate directions on each successive throwing operation, I employ the following parts:

43 is a bracket surmounting one of the arms 12' of the post 12 and to which is pivotally connected a weighted oscillating member 45, so mounted as to be susceptible of rocking to and fro at the perimeter of the trap-base 10.

44 represents pawls pivoted to the arm 12' of the post 12, that carries the bracket 43, and which are adapted to engage the ratchet-teeth 10' upon the upper face of the base 10. These pawls are united to the weighted oscillating member 45 by chains or other connections 46. (See Figs. 3 and 4.)

47 is a trip-rod carried by the oscillating member 45 and extending downwardly therefrom to the perimeter of the base 10.

48 represents bumpers spaced apart and projecting from the perimeter of the base 10 and adapted to be engaged by the trip-rod 47. Each time that the target throw-arm is operated to discharge a target said arm swings forcibly in its rotative movement, and the force imparted to the arm by the arm-actuating mechanism is communicated to the entire upper portion of the trap, rotatably mounted upon the base 10. As a consequence the frame-supporting post 12, loosely seated in the base 10, is rotated in said base and the parts carried thereby rotated therewith. At the time of each rotation of the base-surmounting trap parts only one of the pawls 44 is in engagement with the ratchet-teeth of the base 10, the other pawl being upheld by its connection 46, leading to the oscillating member 45, which is at this time tilted toward the side occupied by the pawl in engagement with the ratchet-teeth of the base. The pawl 44 that is in engagement with the base ratchet-teeth is upon forced rotation being imparted to the base-surmounting parts of the trap forcibly driven against the ratchet-tooth against which it impinges, thereby causing the swinging trap-frame and parts carried thereby to partake of a rebounding action and causing the oscillating member 45 to be thrown into a reverse position, due to the trip-arm 47 striking against the bumper 48 it approaches, thereby elevating the pawl 44 previously in engagement with the ratchet and permitting the other pawl to descend into engagement with the ratchet, so that upon the next operation of the trap the same action will take place as before and the trap-frame be swung in a direction the reverse of its first movement. It is to be understood that there is an interim between the time that one of the pawls 44 is in engagement with the ratchet-teeth of the base and the other pawl is moved into engagement therewith, while the first named is being elevated, and it is in this interim that the swinging motion of the trap-frame takes place.

The operation of my trap has been in part hereinbefore set forth and it only remains to describe the operation of parts in a general way. The person engaged in loading the targets upon the carrier 26 of the trap occupies a position close to the rear end of the trap and resting his arm upon the arm-rest 16 places the targets in the carrier each time that the throw-arm is brought forwardly into the position seen in Fig. 4. Another operator controls the target-throwing mechanism by the operation of the lever 25, which may be located and preferably is located at a distance from the trap, to the mechanism of which it is connected by the pull connection 24. This last-named operator in setting the trap throws the lever 25 forwardly, thereby through the medium of the connection 24 oscillating the rocker 14 and drawing the pull connection 23 in the direction of movement of said lever. The pull connection 23 serves to impart rotation to the pulley-wheel 21, and this pulley-wheel turning loosely on the sleeve 20 acts through the medium of the pawls 22 to impart rotation to the ratchet-wheel 19, shaft 18, and disk 29. The throw-arm 27 being connected to the disk 29 by seating between the sockets 41 and the cushions therein is carried with said disk until it reaches a position above the trap-frame 15, as seen in Fig. 4. Previously, however, to the throw-arm reaching this last position the latch 39 is swung laterally above the trap-frame to cause its lip 40 to move into the path of travel of the throw-arm finger *a* and receive the engagement of said finger, this movement of the latch being due to the forward throw of the shift-rod 38 upon the rotation of the pulley-wheel eccentric 37, by which said shift-rod is actuated. At the time that the throw-arm is being carried to the position above the trap-frame and its finger is moving into engagement with the latch the main operating-spring 32 has been distended and power stored therein due to the connection of said spring to the crank-pin 33, carried by the rotating disk 19. The main operating-spring being now under tension and the throw-arm being held only by the swinging latch, it only remains to release said throw-arm finger when the main operating-spring will impart rotation to the disk 19, shaft 18, disk 29, and throw-arm, during which rotation the pawls 22 ride over the teeth of the ratchet-wheel 19. This is accomplished by the operator of the lever 25 moving said lever rearwardly and permitting the pull connections leading thereto to become slackened. Then the pulley-wheel-retracting spring 26 acts to impart rotation to said pulley-wheel in a direction the reverse of its previous movement. The eccentric hub carried by said pulley-wheel then reciprocates the shift-rod 38 in a direction the reverse of its previous movement, thereby oscillating the latch 39 to a sufficient degree to free the throw-arm by the separation of the latch from its finger. The freed throw-arm is then rotated by the force of the main operating-spring associated with the throw-arm-actuating members. Each time that the throw-arm is actuated the pawls carried by the disk 29 ride over the teeth of the ratchet member 17 adjacent thereto, and when the throw-arm and disk 29 have reached their position of rest after a target has been thrown recoil of the disk and throw-arm is prevented by the pawls engaging with said ratchet member.

It will be seen that the construction of the trap is such as to occasion a continuous rotation of the throw-arm in a circular path without any return movement thereof, and therefore the trap may be rapidly and continuously operated by one person feeding the targets into the carrier and another operating the lever 25 to and fro to place the trap mechanism in throwing condition and release the throw-arm for throwing action.

I claim as my invention—

1. In a target-trap, the combination with a rotatably-mounted throw-arm arranged to move in a complete circle, of a driven member associated with said throw-arm, a pulley-wheel provided with means for engaging said driven member, and means for actuating said pulley-wheel, substantially as set forth.

2. In a target-trap, the combination with a rotatable throw-arm arranged to move in a complete circle, of a driven member associated with said throw-arm, a pulley-wheel having ratchet-and-pawl engagement with said driven member, and means for actuating said pulley-wheel, substantially as set forth.

3. In a target-trap, the combination with a rotatable throw-arm arranged to move in a complete circle, of a driven member associated with said throw-arm, a pulley-wheel having means for engagement with said driven member, means for imparting rotation to said pulley-wheel, and means for retracting said pulley-wheel, substantially as set forth.

4. In a target-trap, the combination of a supporting-frame, a rotatably-mounted throw-arm supported by said frame, a driven member associated with said throw-arm, a pulley-wheel having means for engagement with said driven member, means for imparting rotation to said pulley-wheel, and a retracting-spring connecting said pulley-wheel to said frame, substantially as set forth.

5. In a target-trap, the combination with a rotatable throw-arm, of a driven member associated with said throw-arm, a pulley-wheel having means for engaging said driven member, means for rotating said pulley-wheel, and a power-spring connected to said driven member, substantially as set forth.

6. In a target-trap, the combination with a rotatable throw-arm, of a driven member associated with said throw-arm, a pulley-wheel having means for engaging said driven member, means for rotating said pulley-wheel, a power-spring connected to said driven member, and a retracting-spring connected to said pulley-wheel, substantially as set forth.

7. In a target-trap, the combination of a supporting-frame, a shaft journaled in said frame, a throw-arm carried by said shaft, a driven member fixed to said shaft, a pulley-wheel loosely fitted to said shaft and having means for engaging said driven member, means for imparting rotation to said pulley-wheel, and a power-spring connected to said driven member, substantially as set forth.

8. In a target-trap, the combination of a supporting-frame, a shaft journaled in said frame, a throw-arm carried by said shaft, a driven member fixed to said shaft, a pulley-wheel loosely fitted to said shaft and having means for engaging said driven member, means for imparting rotation to said pulley-wheel, a power-spring connected to said driven member, and a retracting-spring connected to said pulley-wheel, substantially as set forth.

9. In a target-trap, the combination of a rotatable throw-arm, a frame supporting said throw-arm, a latch movably mounted upon said frame in the path of movement of said throw-arm, a pulley-wheel for actuating said throw-arm, means for rotating said pulley-wheel, and a shifting connection between said pulley-wheel and said latch, substantially as set forth.

10. In a target-trap, the combination of a frame, a rotatable throw-arm supported by said frame, a latch movably mounted on said frame in the path of travel of said throw-arm, a pulley-wheel for actuating said throw-arm and provided with an eccentric, means for rotaitng said pulley-wheel, and a shift connection between said eccentric and latch, substantially as set forth.

11. In a target-trap, the combination of a frame, a rotatable throw-arm supported by said frame, a latch movably mounted on said frame and arranged to be engaged by said throw-arm, a pulley-wheel for actuating said throw-arm and provided with an eccentric hub, and a shift-rod loosely fitted to said eccentric hub and connected to said latch, substantially as set forth.

12. In a target-trap, the combination of a frame, a rotatable throw-arm supported by said frame, a stop-finger carried by said throw-arm, a latch movably secured to said frame and arranged to be moved into the path of travel of said stop-finger, a pulley-wheel for actuating said throw-arm and provided with an eccentric hub, and a shift-rod loosely fitted to said eccentric hub and connected to said latch, substantially as set forth.

13. In a target-trap, the combination of a frame, a throw-arm rotatably mounted in said frame, means for rotating said throw-arm, a disk to which said throw-arm is fitted, and ratchet-and-pawl connection between said disk and frame, substantially as set forth.

14. In a target-trap, the combination of a frame provided with a ratchet-face portion, a throw-arm rotatably mounted in said frame, a disk opposing said ratchet-face portion and to which said throw-arm is fitted, and a pawl carried by said disk engaging said ratchet-face portion to prevent retrograde movement of said throw-arm, substantially as set forth.

15. In a target-trap, the combination of a frame, a shaft rotatably supported by said frame, means for rotating said shaft, a throw-arm loosely fitted to said shaft, a disk fixed to said shaft adjacent to said throw-arm, and cushions carried by said disk between which said throw-arm is permitted to play, substantially as set forth.

16. In a target-trap, the combination of a frame, a rotatable throw-arm supported by said frame, a pulley-wheel for imparting rotation to said throw-arm, a rocker swingingly mounted in said frame, a pulley connection leading from said pulley-wheel to said rocker, and means for operating said rocker, substantially as set forth.

17. In a target-trap, the combination with a base having ratchet-teeth at its upper side, of a frame-supporting post swiveled to said base, pawls carried by said post and arranged for engagement with said ratchet-teeth, and an oscillating member carried by said post and having connection with said pawls, substantially as set forth.

18. In a target-trap, the combination with a base having ratchet-teeth at its upper side, of a frame-supporting post swiveled to said base, pawls carried by said post and arranged for engagement with said ratchet-teeth, an oscillating member carried by said post and having connection with said pawls, and a trip-arm carried by said oscillating member and arranged for engagement with said base, substantially as set forth.

19. In a target-trap, the combination with a base having ratchet-teeth at its upper side, of a frame-supporting post swiveled to said base, pawls carried by said post and arranged for engagement with said ratchet-teeth, an oscillating member carried by said post and having connection with said pawls, a trip-arm carried by said oscillating member, and studs projecting from said base arranged to be engaged by said trip-arm, substantially as set forth.

JOHN W. HAUGHAWOUT.

Witnesses:
   J. P. McNAUGHTON,
   H. H. BALDWIN.